United States Patent
Yao et al.

(10) Patent No.: US 7,827,371 B2
(45) Date of Patent: Nov. 2, 2010

(54) METHOD FOR ISOLATING THIRD PARTY PRE-BOOT FIRMWARE FROM TRUSTED PRE-BOOT FIRMWARE

(75) Inventors: Jiewen Yao, Shanghai (CN); Vincent J. Zimmer, Federal Way, WA (US); Qin Long, Shanghai (CN); Liang Cui, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 519 days.

(21) Appl. No.: 11/897,355

(22) Filed: Aug. 30, 2007

(65) Prior Publication Data

US 2009/0063835 A1    Mar. 5, 2009

(51) Int. Cl.
*G06F 12/00* (2006.01)
(52) U.S. Cl. .................. 711/163; 711/152; 711/202; 713/2
(58) Field of Classification Search ............... 711/152, 711/163, 202, 206–208; 713/2
See application file for complete search history.

(56) References Cited

U.S. PATENT DOCUMENTS

| | | | |
|---|---|---|---|
| 7,082,509 B2 * | 7/2006 | Zimmer et al. | 711/170 |
| 7,103,529 B2 | 9/2006 | Zimmer | 703/27 |
| 7,260,848 B2 * | 8/2007 | Zimmer | 726/27 |

OTHER PUBLICATIONS

U.S. Appl. No. 12/156,223, filed May 30, 2008, entitled "Enabling Byte-Code Base Image Isolation," by Jiewen Yao, et al.
U.S. Appl. No. 11/601,321, filed Nov. 16, 2006, entitled "Methods and Apparatus for Defeating Malware," by Vincent J. Zimmer, et al.

* cited by examiner

*Primary Examiner*—Jasmine Song
(74) *Attorney, Agent, or Firm*—D'Ann Naylor Rifai

(57) ABSTRACT

In one embodiment, the present invention includes a method for determining if an isolation driver is present and a processor supports virtualization, launching the isolation driver in a first privilege level different than a system privilege level and user privilege level, creating a 1:1 virtual mapping between a virtual address and a physical address, using the isolation driver, and controlling access to a memory page using the isolation driver. Other embodiments are described and claimed.

9 Claims, 4 Drawing Sheets

METHOD FOR ISOLATING THIRD PARTY PRE-BOOT FIRMWARE FROM TRUSTED PRE-BOOT FIRMWARE

BACKGROUND

In many computer systems, a booting of the system occurs through a series of steps in which initialization is performed, self-testing occurs, a basic input/output system (BIOS) is loaded and executed, and finally control may be passed off to an operating system (OS).

In many systems, trusted code, such as code present in a non-volatile storage of the system provided by an original equipment manufacturer (OEM), operates in the same privilege level as third party code. Accordingly, there is a risk that untrusted or errant third party code can corrupt the system, particularly in a pre-boot environment. As one example, so-called Unified Extensible Firmware Interface (UEFI) code in accordance with the UEFI Specification Version 2.0 (dated Feb. 21, 2006) calls for the separation of pre-boot and boot environments into a variety of phases. However, in these phases both OEM trusted code and third party untrusted/errant code can execute in the same privilege level.

Firmware-based security features, such as cryptographic loading and checking of UEFI-based platform code application signatures using digital signature technology like Authenticode, can only be guaranteed to operate as designed in the field if the implementation of the codes is isolated from untrusted content. To date, pre-OS isolation has been effected via ad hoc, incomplete mechanisms like system management mode (SMM), but in a world where SMM may not be available, or to meet the cross-architecture requirements of UEFI, other solutions are needed.

DETAILED DESCRIPTION

Figure 1:
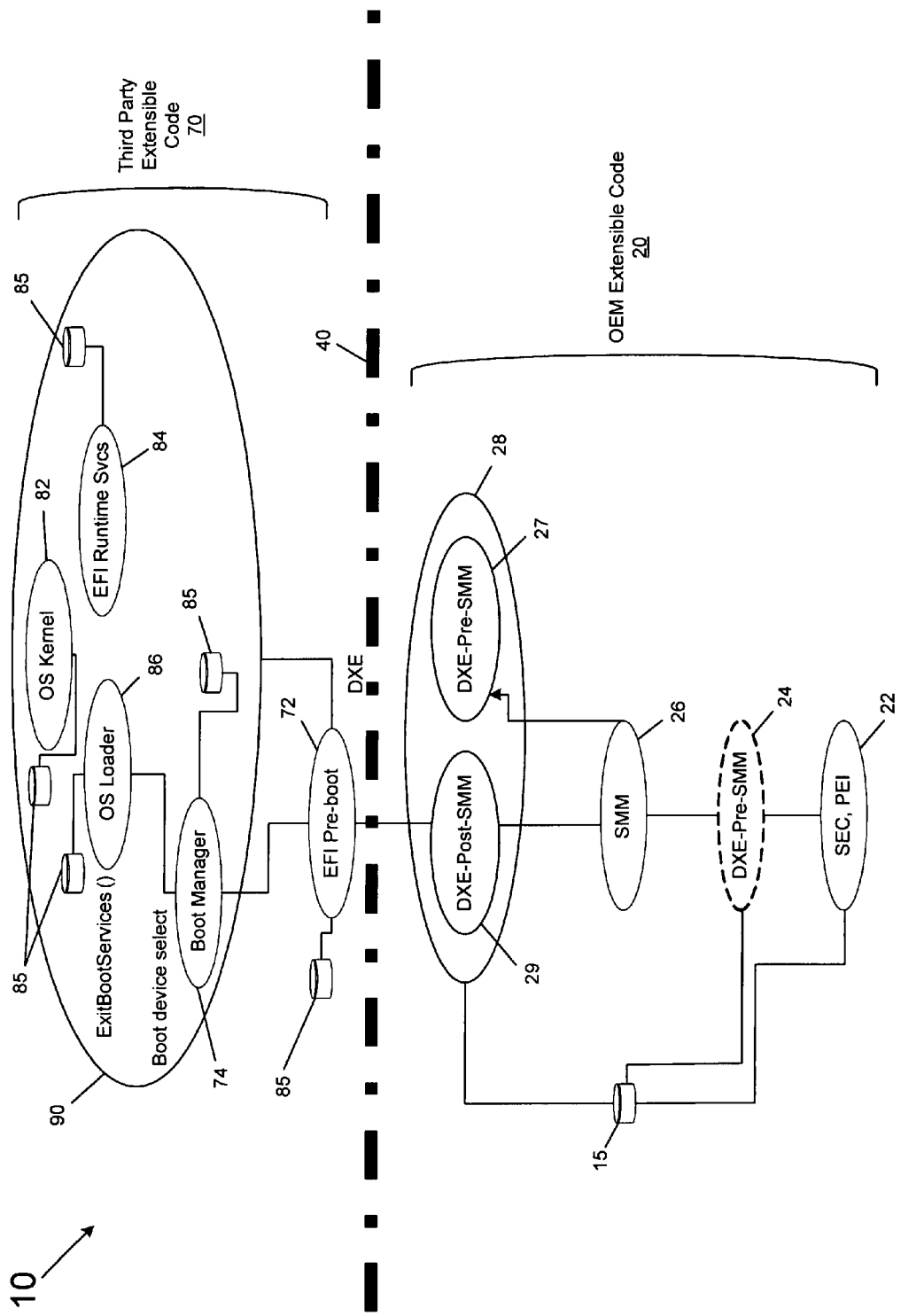
FIG. 1 is a system block diagram in accordance with an embodiment of the present invention.

Embodiments may use virtualization technology, such as available in processors from Intel Corporation, e.g., a so-called virtualization technology (VT)-x for x64 processors and VT-I for Itanium® processors, in order to isolate the standards-based implementation of UEFI interfaces, namely the UEFI Platform Initialization (PI) Architecture Driver Execution Environment (DXE) components. Because of space constraints in today's read only memory (ROMs), the implementation may act as an isolation kernel that maps the machine memory in a 1:1 virtual-to-physical mapping without device emulation, versus a full hypervisor (HV) or virtual machine monitor (VMM) that provides non-1:1 memory mapping and rich device models.

Embodiments may launch a platform isolation kernel. Such isolation barriers are erected prior to launching any untrusted, third party code. Since the reset vector and early firmware flows are all under control of the original equipment manufacturer (OEM), the isolation driver can be launched here. For example, in implementations executing under a UEFI model, first a security phase (SEC) may occur upon machine start or restart. In this security phase, initial operations after platform reset or power on may be performed to ensure firmware integrity is intact. Then a pre-EFI initialization environment (PEI) may be performed in which code may perform minimal processor, chipset and platform configuration to support memory discovery. Then a driver execution environment (DXE) phase may be performed. In this phase, much of firmware code may operate in the pre-boot environment. Such code may be implemented as multiple drivers, which complete initialization of the platform and devices. For example, device, bus or service drivers may be executed responsive to dispatch by a DXE dispatcher.

Prior to the end of such DXE phase, an isolation driver or kernel in accordance with an embodiment of the present invention may be launched prior to loading of any third party code. In various embodiments, in the context of a UEFI environment, this isolation code may be referred to as IsoDxe code. In various embodiments, such code may run in a so-called ring "−1" privilege level, rather than either a system privilege level, i.e., a ring 0 privilege level in which the PEI and DXE phases operate or a user privilege level, i.e., a ring 3 privilege level in which third party applications run. This ring may be a higher privilege than ring 0. In various embodiments, IsoDxe code may be executed using processor virtualization technology to push the UEFI implementation into ring "−1", isolated from third party code.

After such isolation code is executed, the DXE phase may conclude and control passes to a boot device selection (BDS) phase in which a boot dispatcher transitions execution to an OS boot phase, which may include a transient system load (TSL) phase in which a transient OS boot loader executes in a transient OS environment and prepares for a final OS boot loading in which the OS code is executed and accordingly, a run time may proceed in which applications execute using the OS. While described in the context of a UEFI environment, the scope of the present invention is not limited in this regard, and in other embodiments, isolation code may be implemented in different code environments.

In some embodiments, a Clark-Wilson integrity analysis of the pres-OS environment may be performed. Certain controlled data items (CDIs), such as the UEFI System Table (uefi_system_table_data_t) and other internal state objects for the DXE implementation may be provided with appropriate protection. Other pages to be protected may include an implementation of the DXE core, such as its text section from the Portable Executable (PE) Common-Object File Format (COFF) executable. Also, other images beyond the isolation kernel and DXE core code and data can be protected, such as the System Management BIOS (SMBIOS) tables, Advanced Configuration and Power Interface (ACPI) tables, and other DXE drivers that ship with the platform and are loaded by the OEM. The latter class may be distinguished from third party drivers on disk or adaptor cards whose provenance may not be known, thus they are treated as hostile with respect to the OEM DXE code and data (i.e., EFI drivers loaded in TSL may be hostile to those loaded earlier in DXE).

Referring now to FIG. 1, shown is a system block diagram in accordance with an embodiment of the present invention. As shown in FIG. 1, system 10 includes a software model in which OEM extensible code 20 is isolated from third party extensible code 70. The isolation between these code domains is provided by an IsoDxe 40 in accordance with an embodiment of the present invention.

As shown in FIG. 1, OEM extensible code 20 may include SEC, PEI phases 22 which may execute from code present in a non-volatile storage 15, such as platform flash storage.

Further code stored in storage 15 may also implement a DXE phase 24, which hoists a SMM phase 26 into place. At the conclusion of SMM phase 26, it is locked. Still further, an additional DXE phase 28 may execute both DXE pre-SMM code 27 and DXE post SMM code 29. At this point, trusted ring 0 OEM code has been executed, e.g., upon system power up or reset. Then, as described above IsoDxe code segment 40 may be executed, e.g., using virtualization technology available in a processor. This pushes the UEFI implementation into ring "−1" and isolates its execution from third party extensible code 70.

After such execution, as shown in FIG. 1 third party code 70 may execute. Such code may be located, e.g., in a mass storage device 85 such as disk storage. As shown in FIG. 1, third party code may include an EFI pre-boot phase 72, a boot manager 74 which may perform boot device selection, and an OS loader 76. Third party code 70 may further include an OS kernel 82, EFI runtime services 84, in which EFI variables may be used to pass data down to other code executing within system 10. Note that the code modules present in third party extensible code 70, specifically boot manager 74, OS loader 76, OS kernel 82 and EFI runtime services 84 may execute in ring 0 privilege level. Thus all of these code modules may provide a post-EFI boot services compartment 90 for execution in this privilege mode. Although not shown in FIG. 1, understand that various third party application codes may execute in ring 3 using the services in compartment 90. While shown with this particular implementation in the embodiment of FIG. 1, the scope of the present invention is not limited in this regard.

Figure 2:
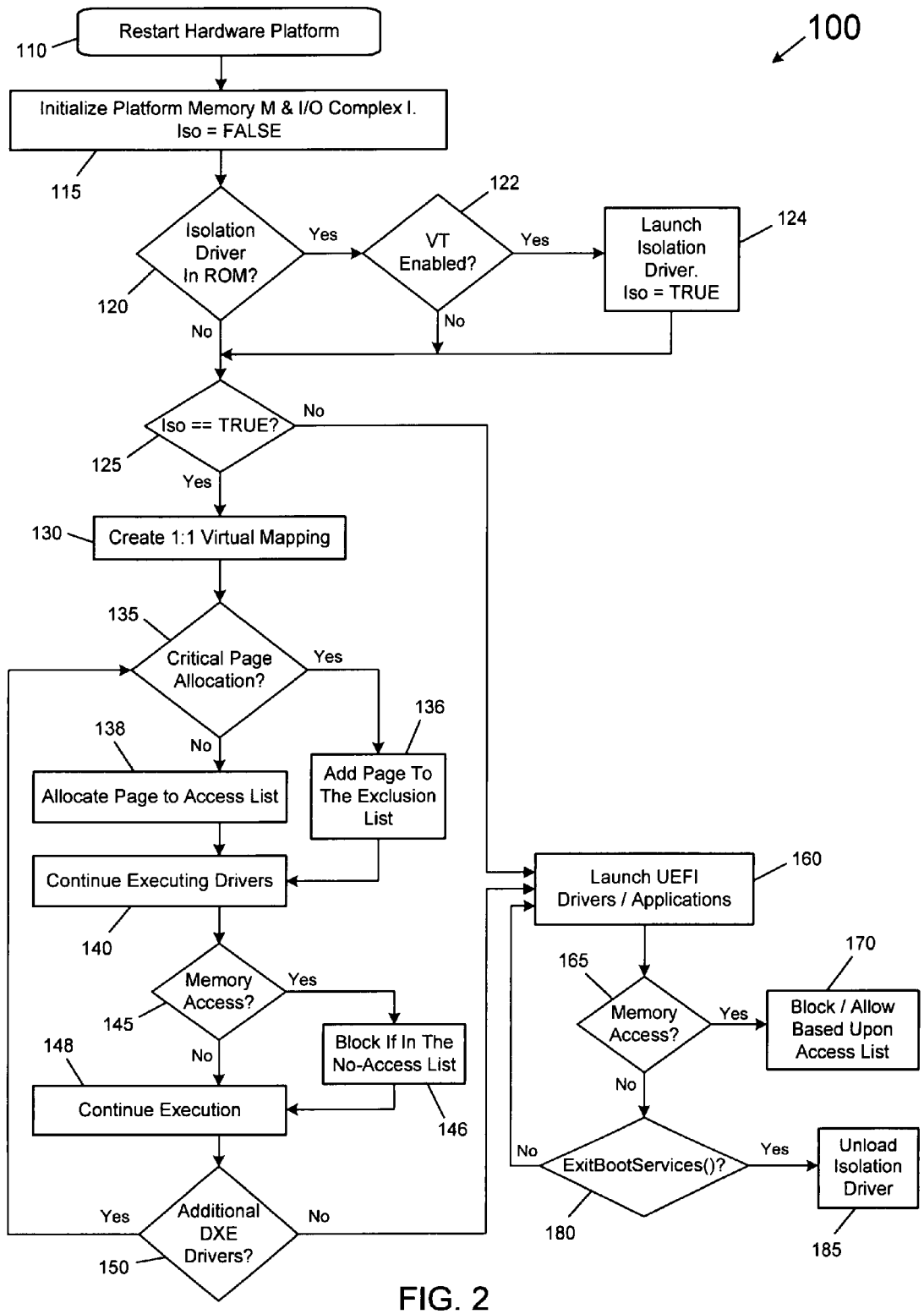
FIG. 2 is a flow diagram of a method in accordance with an embodiment of the present invention.

Referring now to FIG. 2, shown is a flow diagram of a method in accordance with an embodiment of the present invention. As shown in FIG. 2, method 100 may be used to enable isolation code to execute to guard against third party errant code (such as drivers or applications). While shown in the embodiment of FIG. 2 as being in the context of a UEFI implementation, the scope of the present invention is not limited in this regard and embodiments may be performed in various code environments. As shown in FIG. 2, method 100 may begin by restarting the hardware platform. Various hardware such as processors, chipsets and memory may thus be initialized. Thus at block 115, platform memory may be initialized, with memory mapping and an input/output (I/O) complex set with an isolation code equal to false. Then it may be determined whether an isolation driver is present in non-volatile storage (diamond 120). For example, it may be determined whether such code is present in a ROM such as a flash memory. If so, control may pass to diamond 122 where it may be determined whether virtualization technology is enabled in the processor. If so, at block 124 the isolation driver may be launched and the isolation value set to true. The launch of the isolation driver in block 124 can entail enabling virtualization hardware, such as Intel® Virtual Machine eXtensions (VMX) for VT-x, optionally including the enabling of the Secure Machine eXtensions (SMX) for Trusted eXecution Technology (TXT); for the TXT-based invocation, the Launch-Control Policy (LCP) of the secure initialization (SINIT) Authenticated Code Module (ACM) and LCP data objects in Trusted Platform Module (TPM). Non-Volatile Data (NVData) can be used to ensure that the isolation driver is the authorized, correct one. Even in the case where block 124 just enables VMX, the platform firmware launching the isolation driver can use a digital signature across the isolation driver, such as the WIN_CERT found in the UEFI 2.0 specification, in order to assess the integrity of the isolation driver prior to its invocation. In this way it may be ensured that the correct isolation driver is invoked. From all of blocks 120, 122 and 124, control may pass to diamond 125 where it may be determined whether the isolation value is equal to true. If so, control passes to block 130 where a 1:1 virtual mapping may be created. In addition, the 1:1 virtual mapping page table may also be set for Intel® Virtualization Technology for Direct I/O (VTd), which can block the memory access from a Direct Memory Access (DMA). Then it may be determined at diamond 135 whether critical page allocations for a given page have been set. If so, the page may be added to an exclusion list (block 136).

If instead at diamond 135 it is determined that the allocation is not for a critical page, the page may be allocated to an access list (block 138). Control passes to block 140, where drivers may continue executing. Later it may be determined whether a memory access is requested (diamond 145). If so, control passes to block 146 where the access may be blocked if the requested page is in the no-access list, i.e., the exclusion list (block 146). Control passes to block 148 where execution may continue. At the conclusion of a given driver's execution it may be determined whether additional DXE drivers are to be executed (diamond 150). If so, control passes back to diamond 135. Otherwise, control passes to block 160.

Note also that block 160 receives control if it is determined at diamond 125 that the isolation value is not true, i.e., the isolation code is not available or virtualization technology is not enabled.

At block 160, UEFI driver/applications may be launched. During execution it may be determined whether a memory access occurs (diamond 165). If so, access may be blocked or allowed based upon the access list (block 170). Control passes to diamond 180 where it may be determined whether an exit of boot services has been requested. If so, control passes to block 185 to unload the isolation driver. If not, control passes back to block 160 for further execution of drivers/applications. While shown with this particular implementation in the embodiment of FIG. 2, the scope of the present invention is not limited in this regard.

Embodiments may use isolation code in accordance with an embodiment to protect various page tables and other structures. For example, embodiments may be used to protect against corruption or hacking of a system table data, runtime services code table, among other malware attempts. In this way, protection of key entries in various systems tables such as an EFI systems table can be realized. Embodiments may further be used to strengthen firmware security features such as protected variables and driver signing, e.g., by UEFI code. In this way, errant third party driver code may be prevented from usurping UEFI services by avoiding patching of application programming interfaces (APIs) in the UEFI system table.

In some embodiments, a virtual translation lookaside buffer (vTLB) may be used to manage the access state of each page using availability (AVAIL) bits, for example. For example, in one embodiment different page types may be protected using availability bits and other protection structures as follows. Table 1 shows page types and codes to enable page access using isolation code in accordance with an embodiment of the present invention.

TABLE 1

Page type
    Use AVAIL bits (9:11) to mark page type.
      Bit 9: NEED AUTHORIZED
      Bit 10: READ PROTECTED
      Bit 11: WRITE PROTECTED TABLE 1-continued Active Page table (1:1 mapping present)
  For Authorized CODE (Check Write)
    Not allow update
  For Authorized DATA Write (Check Write)
    Check AVAIL bit
  For Authorized DATA Read/Write (Check Access)
    Check AVAIL bit In some embodiments, protection using isolation code may be implemented during a page fault by trapping a page fault during a page table access and determining whether access is allowed according to Table 2, below. As shown in Table 2, based on given status of the AVAIL bits (e.g., bits 9:11) and a type of requested access, access to a given page associated with a table entry may be allowed or denied, as shown in Table 2.

TABLE 2

|    | IP  |    |    |    |    |
| -- | --- | -- | -- | -- | -- |
| PF | AC  | AW | AA | C  | D  |
| AC | Y   | —  | —  | N  | N  |
| AW | Y   | —  | —  | N  | N  |
| AA | Y   | —  | —  | N  | N  |
| C  | Y   | —  | —  | Y  | N  |
| D  | —   | —  | —  | —  | —  |

Figure 3:
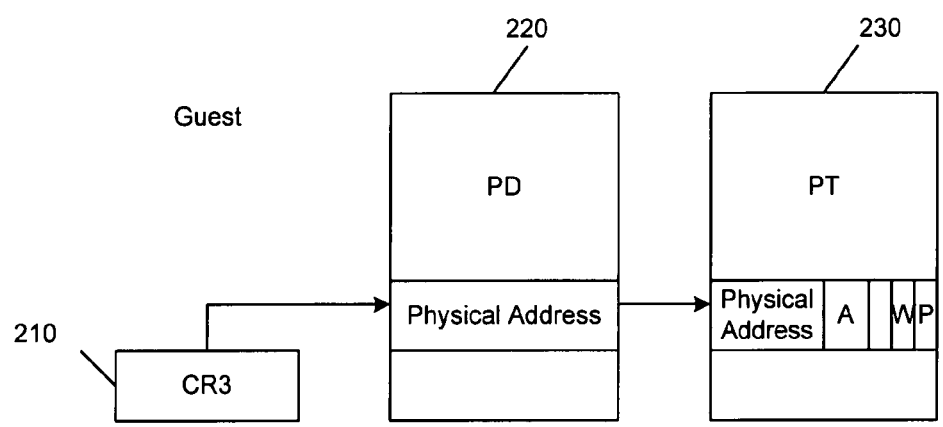
FIG. 3 is a block diagram of protection of page tables in accordance with an embodiment of the present invention.
Figure 3:
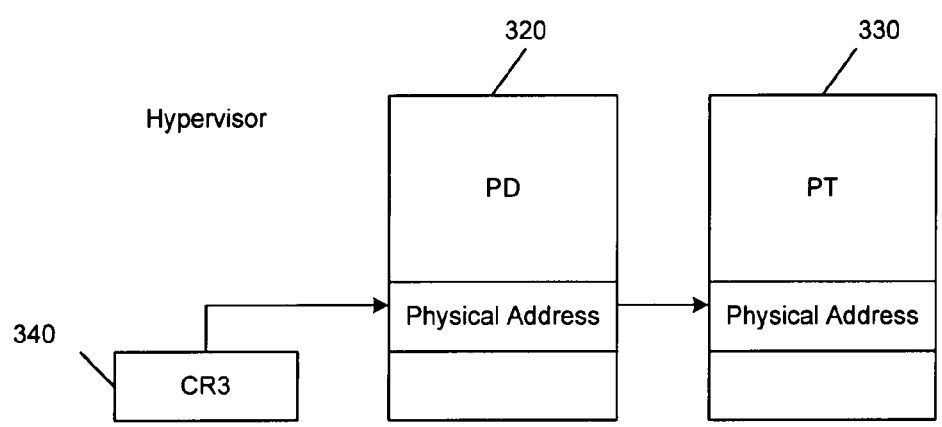

AC: Authorized Code (001b)
AW: Authorized Write Data (101b)
AA: Authorized Access Data (111b)
C: Normal Code (100b or 000b)
D: Normal Data (000b + NEX)
Y: Operation Allow
N: Operation Deny
—: Impossible, need ASSERT Referring now to FIG. 3, shown is a block diagram of protection of page tables in accordance with an embodiment of the present invention. As shown in FIG. 3, paging mechanisms may be protected. While the scope of the present invention is not limited in this regard, in some embodiments 64-bit address translations may be protected, i.e., using a 4-level paging structure to access physical memory. For example a control register (i.e., control register 3) 210 may include a value that acts as a pointer to access a base of a value in a page directory (PD) 220. Each entry in PD 220 may correspond to a physical address which, in turn may be used to access a page table (PT) 230 which may correspond to a guest page table. As shown in FIG. 3, each entry within PT 230 may include a portion of a physical address, AVAIL bits (e.g., bits 9:11), along with a write (W) bit and a protection (P) bit, which may correspond to bits 0 and 1. Thus protection mechanisms may be provided in a guest, e.g., a guest OS or virtual machine (VM) that is controlled by a virtual machine monitor (VMM) or hypervisor (HV). Note that in such embodiments, W and P bits may be set by the HV. Still further, as shown in FIG. 3 in a hypervisor mode of execution, CR3 340 may include a value to access an entry having a physical address within page directory 320 which in turn may be used to access an entry which includes a physical address in page table 330. Thus in hypervisor mode, an active page table may also have 1:1 mapping with read/write permissions. When accessed, the AVAIL bits, along with the W and P bits may determine whether requesting code can access the associated memory page.

Note that embodiments may be combined with trusted boot mechanisms such as a secure initialization or an early launch such as a secure launch control policy (LCP) to guarantee that an authorized isolation driver is executing. Thus embodiments may erect an isolation barrier by pushing DXE into ring "−1", thus breaking compatibility with third party UEFI codes that believe they have unfettered access to ring 0. In this way, embodiments provide for backwards compatibility to enable entities such as an OS loader to access page tables, as isolation code may just protect key DXE pages during its execution.

Figure 4:
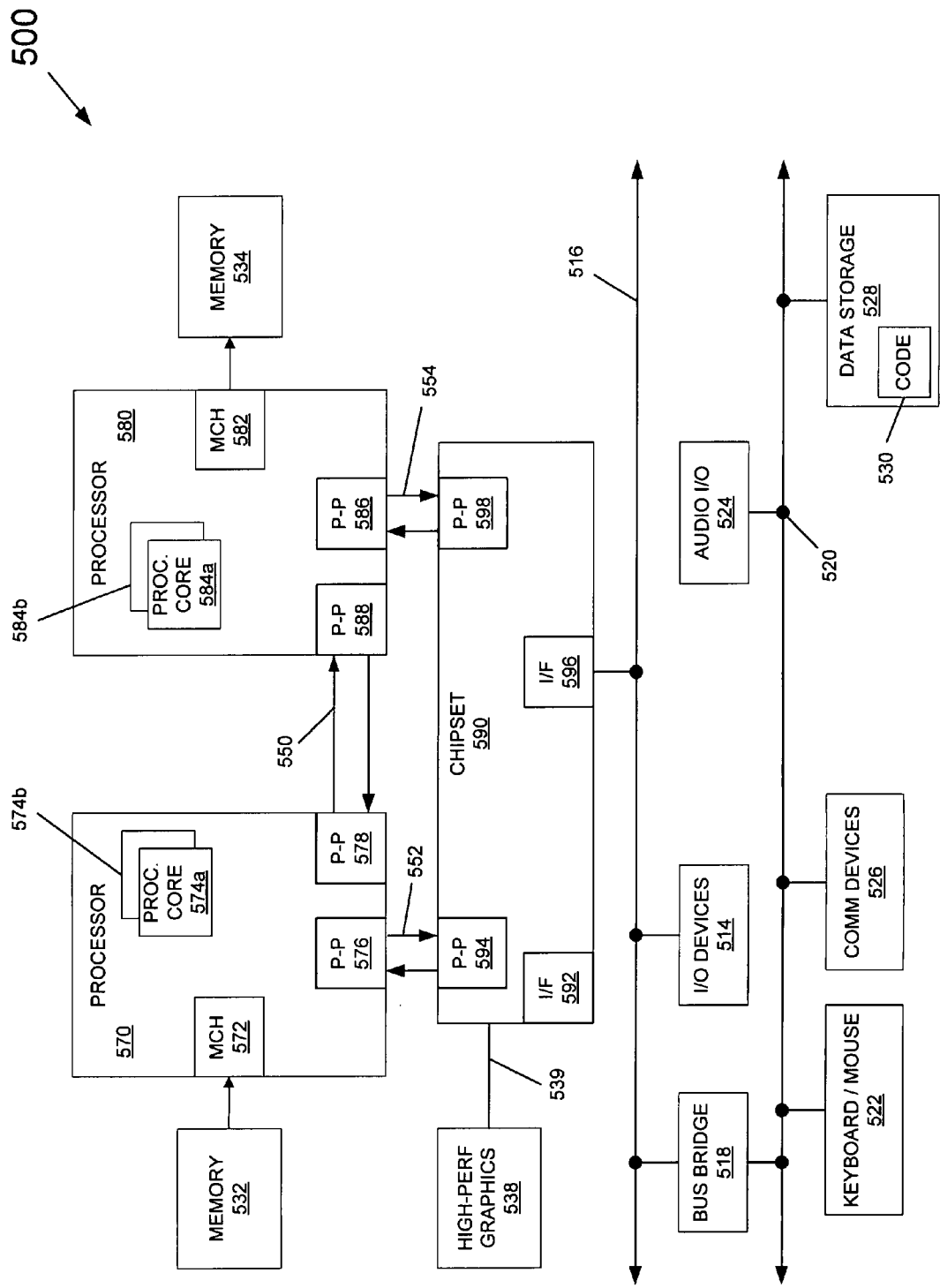
FIG. 4 is a block diagram of a multiprocessor system in which embodiments of the present invention may be implemented.

Embodiments may be suited for many different types of platforms. Referring now to FIG. 4, shown is a block diagram of a multiprocessor system in which embodiments of the present invention may be implemented. As shown in FIG. 4, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 4, each of processors 570 and 580 may be multi-core processors including first and second processor cores (i.e., processor cores 574a and 574b and processor cores 584a and 584b), although other cores and potentially many more other cores may be present in particular embodiments.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538 via a bus 539.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

determining if an isolation driver is present in a non-volatile storage of a system and if so, determining if a processor of the system supports virtualization and if so, launching the isolation driver in a first privilege level, the first privilege different than a system privilege level and user privilege level, and wherein the isolation driver is launched before third party code;

launching the isolation driver prior to a conclusion of a driver execution environment (DXE) phase of a pre-boot environment;

creating a 1:1 virtual mapping between a virtual address and a physical address, wherein the physical address is to be accessed using a page directory entry of a page directory and a page table entry of a page table using the isolation driver;

controlling access to a memory page associated with the page table entry based on a plurality of availability bits of the page table entry; and allocating the memory page to an exclusion list by writing a predetermined code in the plurality of availability bits of the associated page table entry.

2. The method of claim 1, further comprising preventing access to the memory page by code other than the isolation driver if the memory page is allocated in the exclusion list.

3. The method of claim 1, further comprising preventing access to the memory page by an errant third party driver.

4. The method of claim 1, wherein the memory page corresponds to a system table of the DXE phase.

5. The method of claim 1, wherein the memory page corresponds to a runtime service table.

6. An article comprising a machine-accessible medium including instructions that when executed cause a system to:

determine if an isolation driver is present in a non-volatile storage and if so, determine if a processor supports virtualization and if so, launch the isolation driver in a first privilege level, the first privilege different than a system privilege level and user privilege level and at a higher privilege level than the system privilege level and the user privilege level, and wherein the isolation driver is launched before third party code;

launch the isolation driver prior to a conclusion of a driver execution environment (DXE) phase of a pre-boot environment;

create a 1:1 virtual mapping between a virtual address and a physical address, wherein the physical address is to be accessed using a page directory entry of a page directory and a page table entry of a page table using the isolation driver;

control access to a memory page associated with the page table entry based on a plurality of availability bits of the page table entry; and allocate the memory page to an exclusion list by writing a predetermined code in the plurality of availability bits of the associated page table entry.

7. The article of claim 6, wherein the instructions that when executed enable the system to prevent access to the memory page by code other than the isolation driver if the memory page is allocated in the exclusion list.

8. The article of claim 7, further comprising instructions that when executed enable the system to prevent access to the memory page by an errant third party driver.

9. A system comprising:

a processor to execute instructions;

a non-volatile storage including trusted code to execute in a pre-boot environment, the trusted code including first code of a first privilege level, the first code including security code, pre-extensible firmware interface code, and driver execution environment code, second code of a second privilege level, the second code including an isolation driver to prevent third party code from execution in the second privilege level, create a 1:1 virtual mapping between a virtual address and a physical address, wherein the physical address is to be accessed using a page directory entry of a page directory and a page table entry of a page table using the isolation driver, and control access to a memory page associated with the page table entry based on a plurality of availability bits of the page table entry, first instructions that when executed enable the system to launch the isolation driver before the third party code and prior to a conclusion of the driver execution environment, and second instructions that when executed enable the system to allocate the memory page to an exclusion list by writing a predetermined code in the plurality of availability bits of the associated page table entry and prevent access to the memory page by code other than the isolation driver if the memory page is allocated in the exclusion list; and a mass storage device coupled to the processor, the mass storage device including third code of a third privilege level, the third code including the third party code.

* * * * *